N. JENKINS.
Machinery for Dressing Stone, Wood, &c.
No. 218,178. Patented Aug. 5, 1879.
Fig. 1. Fig. 2.
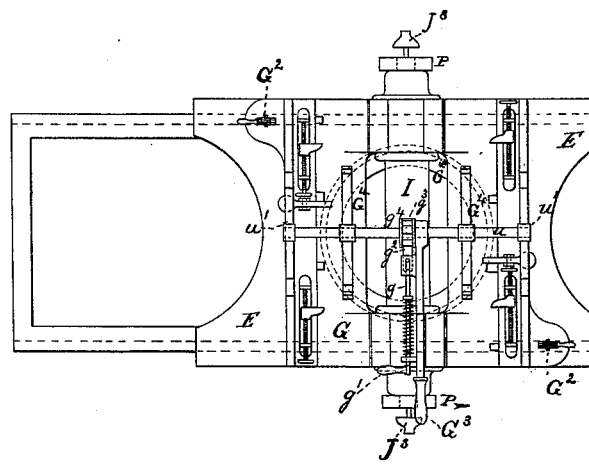 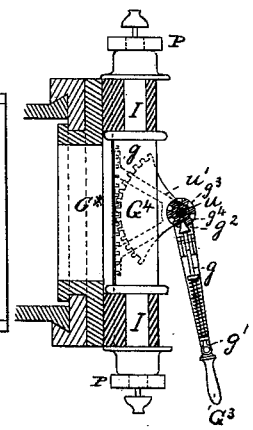
Fig. 3. Fig. 4.
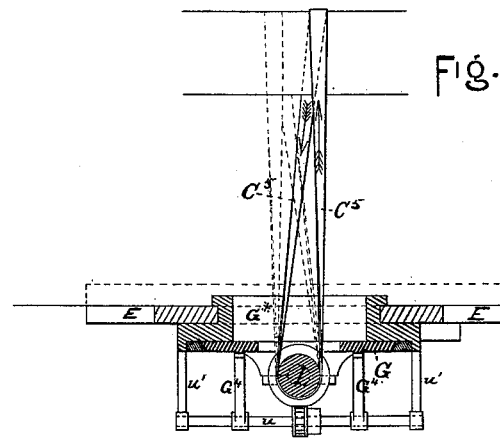 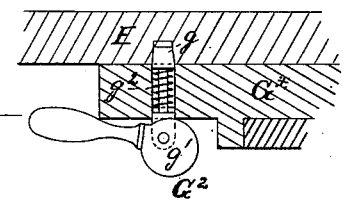
WITNESSES:
W. C. Brookes
Chas. C. Stetson
INVENTOR:
Nicholas Jenkins
by his attorney
J. D. Stetson

UNITED STATES PATENT OFFICE.

NICHOLAS JENKINS, OF NEW HAVEN, CONNECTICUT, ASSIGNOR, BY MESNE ASSIGNMENTS, TO STEPHEN K. STANTON AND BELA HUBBARD.

IMPROVEMENT IN MACHINERY FOR DRESSING STONE, WOOD, &c.

Specification forming part of Letters Patent No. 218,178, dated August 5, 1879; application filed January 3, 1879.

*To all whom it may concern:*

Be it known that I, NICHOLAS JENKINS, of the city and county of New Haven, in the State of Connecticut, have invented certain new and useful Improvements relating to Machinery for Dressing or Paneling Stone, Wood, or other analogous materials; and I do hereby declare that the following is a full, clear, and exact description thereof.

This invention relates to an improvement in means for producing plane or variously-curved surfaces.

In carrying out the invention I employ a revolving mandrel or arbor mounted reversibly in position above the material to be treated. Each end is equipped with a similar cutter, and the mandrel being driven by a partially-crossed belt the reversion of the frame carrying the bearings for the mandrel is practicable. When the mandrel is reversed the belt is partially crossed in the opposite direction, thus giving a reversion of the cutting action.

The following is a description of what I consider the best means of carrying out the invention.

The accompanying drawings form part of this specification.

Figure 1 represents a front view; Fig. 2, a vertical central section; Fig. 3, a sectional scale, and Fig. 4 a horizontal section of part on a larger scale. The figure shows so much of a cutting or dressing machine as will illustrate my invention.

In each of the views similar letters of reference are employed to indicate corresponding parts wherever they occur.

This device is particularly applicable for cutting wood by a revolving cutter, as it enables the cutters to be operated at all times always in a favorable direction in relation to the grain.

It is well understood that to panel or mold wood successfully by a vertical spindle carrying a cutter on its end some means must be provided for running the cutter so that it shall cut the right way of the grain; otherwise even the sharpest cutter is liable to eat into the wood and produce rough bad surfaces.

This end has been heretofore attained by employing two spindles running in opposite directions and bringing them alternately into play. There is danger in such case that while the workman is operating with one cutter he may bring his hand in contact with the other cutter. Even where such serious accident does not occur there is always a liability that some portion of the work may in some contingency touch the wrong cutter and be mutilated. Efforts have been made to defend against these evils by a removable guard adapted to cover the idle cutter for the time being; but workmen are liable, through indolence or from other cause, to omit this precaution.

I make the revolving shaft conveniently reversible in position, and carry a similar cutter on each end. The driving-belt $C^5$ is quarter-twisted in one direction, and the act of reversing the spindle I causes the belt to be quarter-twisted the other way.

It will be obvious that the shaft, when one cutter is at work, must be revolved in the direction the reverse of that when the other is at work. To attain this I mount the carriage G on the cross traversing carriage E by means of a ring, $G^*$, at its back, on an intermediate revolving plate, which latter is traversed with the carriage E and supports the carriage G with liberty from the latter and its connections to be turned.

$G^2$, Fig. 4, is a locking device, which is actuated by a spring, $g^2$, and engages automatically in a hole in the carriage E when the carriage G is in the proper upright position for work.

The device $G^2$ will hold the carriage G and its connections firmly for an indefinite period. Whenever it is desired to reverse the carriage G and its connections, one hand is applied to any convenient part of the carriage G, to act upon it strongly to impart the rotating motion when the other hand is applied to the device $G^2$, and it is partially turned. In turning it the eccentric $g^1$ thereon withdraws the locking portion and sets the carriage G free to be revolved.

There are two of the devices $G^2$ in the two positions represented, and two corresponding holes, $g$, in which they can engage.

It is usually preferable in doing any work with this class of machinery not to change the cutters at every curve or bend in the work which seems to require it, but instead thereof to lift out the cutter, after having executed that part of the curve wherein the grain of the wood comes right, and, having produced all those cuts for which that motion of the cutter is adapted, to then reverse the carriage G, and consequently the shaft I, and again lower and raise the carriage and its connections, while the cutter now revolving in the reverse direction is made to execute the remainder of each curve.

I can, by employing an increased number of the locking devices $G^2$, or an increased number of cavities $g$, in which they shall lock, hold the arbor I firmly in various inclined positions. This may be of use in executing some kinds of work. Some of the advantages described as accruing from the inclination of the table supporting the work to be cut or operated upon may be attained by this device by working with a level table, and with the cutter $J^8$ inclined or placed at an angle.

Changeable collars P and their locking means, which form the subject-matter of a separate application for patent, are particularly useful in connection with this reversible arbor. The collars must be applied at each end. A loose collar of some size, whether changeable or not, is, by preference, employed to serve as a guide to roll against the templet, and the collar is mounted not on the rapidly-revolving spindle I, but on an extension from the carriage G, which surrounds the spindle and relieves the collar and spindle from what would otherwise be a severe friction on each other.

The carriage G is capable of traversing up and down in guides in the carriage E. It is moved up and down by segments $G^4$, turning on a shaft, $u$, carried by brackets $u'$ from the carriage E, and operated by a lever, $G^3$, and engaging with the carriage G by means of racks $g$.

The handle or lever $G^3$ is pivoted loosely on the axle $w$, so that its position in relation to the segments $G^4$ may be capable of adjustment at will by means of the sliding spring-rod $g$, which works in bearings in the side of the lever $G^3$, and is operated by means of a handle, $g^1$, affixed on its outer end, while at its inner end it is provided with a locking-piece, $g^2$, which is adapted to engage in any one of a series of holes or recesses, $g^3$, in a box, $g^4$, formed on or affixed to the shaft or axis $u$ of the segments $G^4$.

It will thus be seen that by simply withdrawing the locking-piece $g^2$, by means of the handle $g^1$, from either of the recesses $g^3$ in which it may for the time being rest, the position of the lever $G^3$ in relation to the segments $G^1$ may be changed at will. This is particularly advantageous with this reversible arbor; but it may be employed with machines having fixed or non-reversible arbors.

The parts not represented may be of any ordinary or suitable description.

This invention is intended more particularly for working wood, and it has been so described; but it may be used for treating marble, slate, and material generally.

I claim as my invention—

1. The reversible cutter-arbor I, mounted on the turning-plate G*, and carrying a cutter, $J^8$, at each end, in combination with the driving-belt $C^5$, arranged to serve as herein specified.

2. The reversible arbor I, with its cutters $J^8$ and belt $C^5$, as specified, in combination with one or more locking-catches, $G^2$, as shown and described.

3. The combination, with the carriage G and racks $g$, segments $G^4$, and recessed box $g^4$, of the loose handle or lever $G^3$, and spring-locking device $g^2$, substantially as and for the purpose described.

In witness whereof I have hereunto set my hand this 22d day of June, 1878, in the presence of two subscribing witnesses.

NICHOLAS JENKINS.

Witnesses:
W. COLBORNE BROOKES,
CHAS. C. STETSON.